Patented June 26, 1951

2,557,935

UNITED STATES PATENT OFFICE 2,557,935

RESINOUS REACTION PRODUCT OF AN AROMATIC POLYKETONE AND A POLYSULFONAMIDE AND PROCESS

Herman S. Bloch, Chicago, and Ralph B. Thompson, Riverside, Ill., assignors to Universal Oil Products Company, Chicago, Ill., a corporation of Delaware No Drawing. Application June 20, 1947, Serial No. 756,087

14 Claims. (Cl. 260—65)

The present invention relates to a process for the production of resinous materials useful in many arts as components of coating compositions, as raw materials in the formation of moldable plastic-like objects, as plasticizers in rubber compositions and for other uses common to resins of the present type. More particularly, the invention concerns a new class of resinous product characterized either as a thermosetting or as thermoplastic type depending upon the structure of the reactants as hereinafter set forth, said resin being formed by reacting an aromatic polyketone and a polysulfonamide at conditions resulting in the liberation of water as a by-product of the reaction and the condensation of the reactants to form said resinous product.

The formation of the present resinous condensation product is ordinarily effected in the absence of any recognized catalytic agent for increasing the speed of reaction or for increasing the yield of resinous products. One object of this invention, therefore, is to prepare a thermosetting or thermoplastic resinous material (depending upon the conditions of reaction and the structure and type of polysulfonamide reactant employed) by means of a simple condensation reaction in the absence of any added catalytic agent, thereby eliminating the necessity of removing or recovering catalytic material from the finished resinous product following the condensation reaction in which the resin is formed.

It is another object of the invention to provide a process for the production of resinous materials useful in the preparation of coating compositions such as paints and varnishes, as plasticizers for synthetic or natural rubber, as raw materials in the formation of moldable plastic-like objects, as adhesives and for other uses of like character.

In one specific application of the present process, an aromatic diketone is condensed with a benzenepolysulfonamide at reaction conditions resulting in the formation of a hard, brittle thermosetting resinous condensation product having a high softening point and a glossy surface.

In a more specific embodiment of the invention, an aromatic diketone is heated with an equimolecular proportion of an aliphatic disulfonamide at a temperature within the range of from about 50° to about 350° C. until one molecular proportion of water has been eliminated from the reaction mixture per ketone group charged to the reaction as the aromatic diketone, forming as a result of the reaction a thermoplastic resinous condensation product.

Other embodiments of the invention relating to specific reactants and to certain means of effecting the condensation reaction will be hereinafter referred to in the following further description of the invention.

In accordance with the present process, we have discovered that aromatic polyketones, wherein the keto groups are attached either to an aryl nucleus or to a carbon atom in the side chain attached to the aryl nucleus, may be condensed with a polysulfonamide of either aliphatic, aromatic, alicyclic or heterocyclic structure or with mixtures of said polysulfonamides to yield a resinous condensation product which may vary in hardness from soft pliable masses to hard, brittle solids and which normally have clear, transparent properties and in some cases a color ranging from light to darker shades of amber.

The reaction mechanism, by means of which the present resinous products are believed to be formed, presumably involves the condensation of one or both of the hydrogen atoms of the amide groups present in the polysulfonamide reactant (depending upon reaction conditions and whether an unsubsituted or a N-substituted sulfonamide is employed as the polysulfonamide reactant) with the keto oxygen atoms of the aromatic polyketone reactant forming water and the resinous condensation products herein provided. In any given resinous product formed by the reaction of an aromatic polyketone and a polysulfonamide, there may appear one or more monomer condensate units according to Equation 1 below in which the products have one or more of the following structures given in formulas (A), (B) and (C) shown in Equation 1.

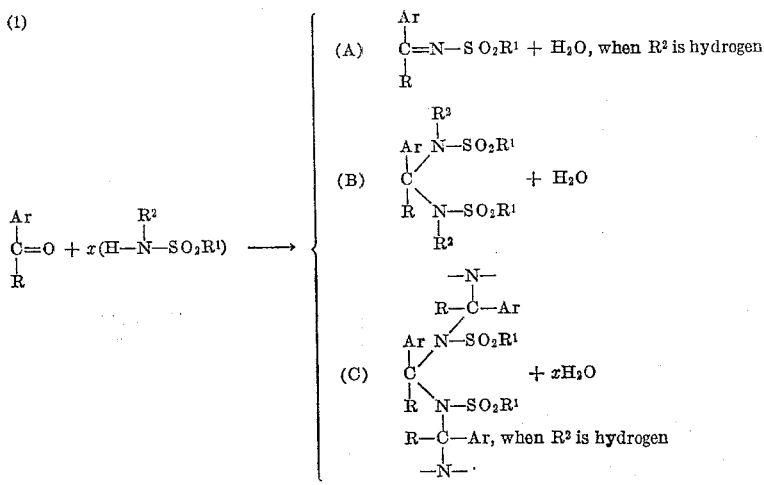

wherein R may represent an alkyl, aryl, alkenyl, aralkyl, or alicyclic radical; $R^1$ represents one of the foregoing radicals to which at least one additional sulfonamide group is attached; $R^2$ may be hydrogen or may be selected from the same group as R; and Ar represents an aromatic nucleus containing at least one additional keto group in the aromatic polyketone reactant, said aromatic nucleus being derived from the mono- or polynuclear aromatics such as benzene, diphenyl, anthracene, naphthalene, etc. and $x$ represents the numeral 1 or 2 depending upon whether one or two sulfonamide groups condense with each keto group of the aromatic polyketone. Formulations (B) and (C) in the above Equation 1 represent structures obtained when the so-called cross-linking type of linkage is obtained in the condensation reaction. Cross-linking is believed to occur when one hydrogen atom from the amide group and another hydrogen atom from a second amide group, said amido groups being either on the same or different polysulfonamide molecules, condense with a single keto group of the aromatic polyketone reactant. When the so-called cross-linking effect is obtained, depending upon the reaction conditions and the type of polysulfonamide charged, the resulting resinous product is a high molecular weight molecule containing a highly branched chain structure in which the linkages are believed to be in non-linear relationship to each other and wherein the linkages are believed to extend between chains of adjacent condensate units of the resin molecule. On the other hand when the type of linkages shown by formula (A) above is obtained, the resinous condensate is a linear chain-like molecule giving rise to a thermoplastic type resin comprising a number of condensate units joined in a continuous chain-like or linear fashion forming a polymer of said condensate units which may be fused at a reasonably low temperature and which is relatively soluble in organic solvents. Usually, all three types of the above structural arrangements are present in a given resinous product, although when a large number of cross-linking arrangements are present in the resinous product, the latter is likely to be thermosetting, and is likely to form a product which is insoluble in organic solvents.

The reactant herein referred to as the aromatic polyketone which when reacted with a polysulfonamide forms the present resinous condensation product, is defined structurally as a compound containing an aromatic nucleus which is either mono-nuclear (that is, benzenoid) in structure or poly-nuclear, the former being represented as derived from benzene and the latter being derived from such polynuclear aromatics as for example naphthalene, anthracene, phenanthrene, etc. Polyketones derived from heterocyclic aromatic compounds, as for example, quinoline, coumarone, benzothiofuran, carbazole and the like are also suitable. The aromatic polyketone is further characterized as being substituted on at least one of the nuclear positions of the aryl radical by an acyl group and/or a radical containing one or more keto groups, the total number of keto groups being two or any number greater than two. The indicated aromatic polyketone may be represented by such compounds as o-, m-, or p-diacetylbenzene, the various diacetyldiphenyls, o-, m-, or p-acetylbenzophenone, benzil or benzil-like compounds wherein the keto groups are separated by an intervening alkyl group (as, for example, in dibenzoylmethane) and others of this class containing two or more keto groups or containing other radicals such as alkyl, alkenyl, aryl, cycloalkyl, amido, amino, halo, nitro, hydroxy, carboxy, alkoxy, acyloxy or sulfonic acid groups. Of the indicated utilizable derivatives, the aromatic polyketones containing one or more amide groups, preferably occupying a position in the molecule at least 5 carbon atoms removed from the ketonic group, thus substantially eliminating cyclization between said groups, are of especial note, the latter compounds yielding resinous condensates by themselves or with other polysulfonamides and other aromatic polyketones having distinctive physical properties. The molecular weight and number of keto groups in the aromatic polyketone reactant determines the molecular weight of the resultant resinous condensation product. From our investigation of the present reaction, it has been determined that any number of keto groups may be present in the aromatic polyketone, and its molecular weight is limited only by practical considerations, such as its melting point, which ordinarily must be sufficiently low for the compound to melt at the reaction temperature and mix with other reactants.

The reactant herein specified as a polysulfonamide utilized as one of the reacting materials in the present condensation reaction to form the resinous product of this invention, may be selected from the aliphatic, alicyclic, heterocyclic or aromatic polysulfonamides which may further be saturated or unsaturated in character. The polysulfonamides may also be substituted on one or more of the amido nitrogen atoms by alkyl, aryl, aralkyl, cycloalkyl or heterocyclic groups and may contain one or more radicals other than said sulfonamide groups attached to the hydrocarbon residue of the sulfonamide molecule such as amino, halo, alkoxy, hydroxy, carboxy, nitro or acyloxy groups as well as thio acid and carboxylic acid amide radicals, the latter groups when present in the structure of the polysulfonamide generally altering the physical and chemical properties of the ultimate resinous condensation product obtained in the process of this invention. Typical representative examples of the polysulfonamide reactants utilizable herein are given in the following Table I, the list merely representing some of the types specified above and not being an exclusive or complete listing of possible compounds utilizable herein.

TABLE I

*Typical polysulfonamide reactants*

| Type | Name |
|---|---|
| Aliphatic, saturated | $H_2NSO_2-CH_2-CH_2-SO_2NH_2$<br>1,2-ethanedisulfonamide |
| Aliphatic, unsaturated | 4,5-disulfonamidohexene-2 |
| N-substituted | Ethane-1-sulfonamide-2-(N-methyl) sulfonamide |
| Alicyclic, saturated | 1,3-cyclohexanedisulfonamide |
| Alicyclic, unsaturated | 3,5-disulfonamidocyclohexene-1 |
| Aryl | p-benzenedisulfonamide |
| Aralkyl | 1-sulfonamido-2-(m-sulfonamido)-phenylethane |
| Heterocyclic | 2,4-pyridinedisulfonamide |
| Aryl, amino substituted | 2-amino-1,4-benzenedisulfonamide |

| Type | Name |
|---|---|
| Aryl, carboxamide substituted. | 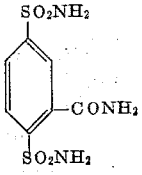 2-carboxamido-1,4-benzene-disulfonamide |
| Polyamides | 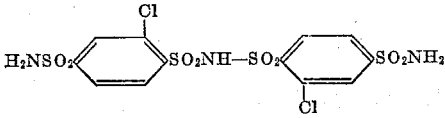 bis(1-chloro-4-sulfonamidobenzenesulfonyl)imide |

Of the many types and classes of polysulfonamides utilizable as reactants in the present process, it is characteristic of said compounds that the amide nitrogen atom has attached thereto, at least one and preferably two hydrogen atoms capable of condensation with the keto group of the aromatic polyketone reactant to form the resinous condensation product herein described. If mono N-substituted polysulfonamides are utilized as reactants, the substituents may be such radicals as alkyl, alkenyl, aryl, aralkyl or alicyclic groups which may be further substituted with radicals such as hydroxy, carboxy, nitro, amino, etc. The presence of unsaturated linkages within the organic residue of the polysulfonamide reactant as well as the aromatic polyketone, such as compounds containing alkenyl and/or alkadienyl groups, generally renders the resinous condensation product subject to further polymerization, as for example, at high temperatures and in general, alters the physical properties of the product. The products from reactants containing unsaturated linkages or groups are generally of higher melting point, and are frequently more brittle or are more highly elastic than products formed from substantially saturated reactants. Linear and self-condensation products made by the self-condensation of ketosulfonamides, ketocarboxylic acid amides, and ketoamines as represented, for example, by the self-condensation product of p-sulfonamido-acetophenone:

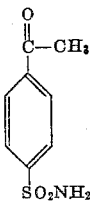

represent a useful class of materials. Such keto-amides or keto-amines may likewise be condensed with polyketone-polyamide mixtures.

It is a further general requisite of both the polysulfonamide and the aromatic polyketone reactants that they melt at temperatures below the condensation reaction temperature hereinafter specified, thereby enabling the reactants to be intimately mixed while in a molten state and permit the respective amido and keto functional groups thereof to come into inter-molecular contact and effect condensation of the reacting components. Alternatively, the reactants may be dissolved in a suitable solvent which mutually dissolves the reactants and thus permits the requisite inter-molecular contact of the amido and keto functional groups.

The condensation reaction involved in the present process is effected at temperatures of from about 50° to about 350° C., the lower temperature limits of the above range being provided for reactants having low melting points, such as the low molecular weight polysulfonamides and aromatic polyketones and for those reactants which condense rapidly at mild temperature conditions. The reaction is undesirably sluggish below about 50° C., and temperatures above 350° C. result in excessive decomposition and degradation reactions. In the case of the less reactive starting materials or those reactants having a high melting point, the mixture of reactants is desirably heated to temperatures within the upper limits of the above temperature range to effect condensation at a reasonably rapid rate. In some instances, especially in case one of the above classes of starting materials melts at a high temperature, it will be preferable to employ a low molecular weight compound for the other class of starting material. Thus, the low molecular weight reactant while in a molten state dissolves the reactant melting at a high temperature and permits the intimate admixture desirable for obtaining reaction between the functional groups of the reactants. Usually it is not necessary to employ superatmospheric pressures in carrying out the reaction, except in case of utilizing a low boiling reactant and/or a high temperature to effect the reaction when it becomes desirable to maintain the latter material in liquid phase during the reaction.

In some cases it may be advantageous to employ catalysts of an acidic or dehydrating nature, such as zinc chloride, hydrogen chloride, and the like. The proportion of reactants employed in the condensation will vary in accordance with the type and number of sulfonamide groups and keto groups in each of the respective reactants. In the case of a polysulfonamide reactant in which the amido groups are not substituted by non-condensable groups (that is, groups other than hydrogen such as alkyl or aryl), equimolecular proportions of the aromatic polyketone will theoretically react with a given proportion of polysulfonamide reactant in which the number of amide groups per molecule is the same as the number of keto groups per molecule of the aromatic polyketone. In the case of a polysulfonamide reactant in which all of the amido nitrogen atoms are mono substituted by a non-condensable group, the corresponding theoretical ratio of reactants is two molecular proportions of polysulfonamide to each molecular proportion of aromatic polyketone, if the number of amide groups per molecule of the former is equal to the number of keto groups per molecule of the latter. Expressed in another manner, it may be said that the ketone group is mono-functional with respect to a sulfonamido group (—SO₂NH₂) and bi-functional with respect to an alkyl substituted amido group (—SO₂NHR, where R is alkyl); and the proportions of reactants are so adjusted that there are at least equifunctional amounts of ketone and amide, preferably up to about two reactive equivalents of said keto groups to said sulfonamido groups. In cases wherein a linear polyamide condensation product is caused to react with an aromatic polyketone, however, even small amounts (as low as 1 to 10 per cent, or even less) of the ketonic material may be sufficient to convert the thermoplastic polysulfonamide to a higher melting or even a thermosetting derivative by the establishment of cross linkages between the linear condensation chains.

It is within the scope of the present invention to effect the condensation reaction in the presence of a solvent which is miscible with the reactive starting materials and/or the resinous product. The solvent, when utilized, may be selected from hydrocarbons having suitable boiling points such as hexane, benzene, petroleum ether and in some cases non-hydrocarbon solvents such as diphenyloxide, other ethers such as dipropyl ether, dibutyl ether, etc. It is preferred to utilize a solvent which boils at a temperature above the reaction temperature required for the condensation reaction, although in some instances, the solvent may be present in the reaction mixture for the express purpose of providing a refluxing medium which maintains the temperature of reaction at a constant value, the boiling point of the solvent. The solvent may also be expressly added to the reaction mixture to form an azeotrope with the water liberated during the condensation reaction, thus providing a means for removing the latter by-product from the reaction mixture, either during the condensation reaction or following the formation of the product. In many cases it is desirable to employ the solvent as a diluent of the reactants so as to control the rate of reaction or the temperature developed in the reaction mixture. When such precautions are taken, the product usually have a more desirable color and its other physical properties such as flexibility and hardness are improved.

After completion of the initial condensation reaction and the separation of the product thereof from the reaction mixture, the resin may be dried and pulverized into a finely divided condition suitable for subsequent molding operations, mixing into protective or covering compositions or for utilization in the manufacture of other compositions, such as plastics. In case an excess of either reactant is employed in the condensation reaction, or if the initial stage of the reaction is not allowed to proceed to complete condensation of the components, the reaction product separated from the initial stage of the condensation may be further reacted with additional quantities of either of the reactants to form thereby a product having properties differing from the initial or partial condensation product. Alternatively, the excess of reactant may be removed from the product by extraction with a suitable solvent, for example, one which is miscible with either the excess reactant or with the resinous product to effect thereby a separation of these components from the partial condensation product. The final stage of the reaction or completion of the condensation of the reactants present in the partially condensed product may be conducted in a heated mold or other shaping apparatus when desired. We have found that a convenient means for forming molded articles is to conduct the initial reaction to a stage of partial completion, forming thereby a soft resinous product which usually possesses thermoplastic properties and thereafter completing the reaction by heating the initial reaction product in the desired mold, thus forming the thermosetting resinous product of this invention which is relatively little deformed at a high temperature and in general is tougher than the initial or partial condensation product.

Resinous products obtained in the present process have widespread utility in various arts, depending in large measure upon the physical properties of the product. The resins, for example, may be composited with various drying oils such as the glyceride type or unsaturated hydrocarbon type to form varnish and/or paint compositions, and when employed for said purposes, the resins contribute valuable film-forming and bodying properties to such compositions. The protective coatings prepared from the present resins form a glossy surface resistant to chemicals, water and abrasive agents and such compositions in which solid resins of this invention are incorporated dry to hard non-tacky films. In some cases, the products of this invention are useful as plasticizers, especially when the product is a semi-solid or viscous liquid resin. When solid resinous products of the thermoplastic type are obtained, these may be melted or extruded into variously shaped articles or used to impregnate cellulosic materials such as paper or shaped wooden articles, or the resin may be heated with wood flour, wood chips, cotton linters, asbestos or other fibrous materials to form semi-rigid or rigid structural shapes.

The following example is introduced for the purpose of illustrating the present process and the properties of the product obtained from the condensation of typical reactants as disclosed herein. In thus citing a specific application of the invention, it is not intended however to limit the generally broad scope of the invention in accordance with the conditions and reactants utilized therein.

A mixture of 16.2 g. of p-diacetylbenzene and 23.6 g. of m-benzenedisulfonamide was heated in a nitrogen atmosphere at 145–150° C. for 3.5 hours. The resultant yellowish-brown viscous mass, on cooling, proved to be a tough resin of softening point about 180–190° F.

A similar mixture was refluxed in commercial xylene (100 ml.) until the solution became cloudy, and the vapors were then slowly distilled overhead until the water layer of the condensate reached a volume of about 3.5 ml. The xylene was thereupon removed in vacuo, leaving a product which was lighter in color than that formed above and which did not soften at 212° F.

We claim as our invention:

1. A process for the production of a resinous product which comprises reacting a diacetylbenzene with ethane disulfonamide at a temperature of from about 100° to about 200° C. to form said resinous product.

2. The process which comprises reacting p-diacetylbenzene with m-benzenedisulfonamide at about 145–150° C. to form a resinous condensation product thereof.

3. A process for the production of a resinous product which comprises reacting, at a condensation temperature of from about 50° C. to about 350° C., an aromatic polyketone in which the keto groups are the only reactive groups with a polysulfonamide in which the sulfonamide groups are the only reactive groups and in which each sulfonamide group contains at least one hydrogen atom attached to the nitrogen atom of the group.

4. The process of claim 3 further characterized in that said aromatic polyketone is a benzene diketone.

5. The process of claim 3 further characterized in that said aromatic polyketone is a diacetylbenzene.

6. A process for the production of a resinous product which comprises reacting, at a condensation temperature of from about 50° C. to about 350° C., an aromatic diketone in which the keto groups are the only reactive groups with a disulfonamide in which the sulfonamide groups are the only reactive groups and in which each sulfonamide group contains at least one hydrogen atom attached to the nitrogen atom of the group.

7. A process for the production of a resinous product which comprises reacting, at a condensation temperature of from about 50° C. to about 350° C., a benzene diketone in which the keto radicals are the only reactive groups with a benzene disulfonamide in which the sulfonamide groups are the only reactive groups and in which each sulfonamide group contains at least one hydrogen atom attached to the nitrogen atom of the group.

8. The process of claim 3 further characterized in that said polysulfonamide is an aliphatic polysulfonamide.

9. The process of claim 3 further characterized in that said polysulfonamide is an unsaturated aliphatic polysulfonamide.

10. The process which comprises reacting p-diacetylbenzene with m-benzenedisulfonamide at a temperature of from about 50° C. to about 350° C. to form a resinous condensation product thereof.

11. The resinous product produced by the process of claim 3.

12. The resinous product produced by the process of claim 6.

13. The resinous product produced by the process of claim 7.

14. The resinous product produced by the process of claim 10.

HERMAN S. BLOCH.
RALPH B. THOMPSON.

REFERENCES CITED

The following references are of record in the file of this patent:

UNITED STATES PATENTS

| Number | Name | Date |
|---|---|---|
| 2,160,196 | Bruson et al. | May 30, 1939 |
| 2,229,744 | Kern | Jan. 28, 1941 |
| 2,365,599 | Schirm | Dec. 19, 1944 |
| 2,484,529 | Roedel | Oct. 11, 1949 |